United States Patent
Hasemi

(10) Patent No.: US 11,593,471 B2
(45) Date of Patent: Feb. 28, 2023

(54) SOUND EMITTING DEVICE, SOUND COLLECTING DEVICE, MICROPHONE AUTHENTICATION SYSTEM, AND MICROPHONE AUTHENTICATION METHOD

(71) Applicant: YAMAHA CORPORATION, Hamamatsu (JP)

(72) Inventor: Kentaro Hasemi, Kagawa-Ken (JP)

(73) Assignee: YAMAHA CORPORATION, Hamamatsu (JP)

( * ) Notice: Subject to any disclaimer, the term of this patent is extended or adjusted under 35 U.S.C. 154(b) by 438 days.

(21) Appl. No.: 16/834,248

(22) Filed: Mar. 30, 2020

(65) Prior Publication Data

US 2020/0226244 A1    Jul. 16, 2020

Related U.S. Application Data

(63) Continuation of application No. PCT/JP2017/036791, filed on Oct. 11, 2017.

(51) Int. Cl.
| | | |
|---|---|---|
| *G06F 3/16* | (2006.01) | |
| *G06F 21/44* | (2013.01) | |
| *G10L 25/51* | (2013.01) | |
| *H04R 1/08* | (2006.01) | |

(52) U.S. Cl.
CPC .............. *G06F 21/44* (2013.01); *G06F 3/165* (2013.01); *G10L 25/51* (2013.01); *H04R 1/08* (2013.01)

(58) Field of Classification Search
CPC ......... G06F 21/44; G06F 3/165; G10L 25/51; H04R 1/08
See application file for complete search history.

(56) References Cited

U.S. PATENT DOCUMENTS

| | | | |
|---|---|---|---|
| 9,319,816 B1 * | 4/2016 | Narayanan | G01H 3/00 |
| 9,491,237 B1 * | 11/2016 | Garg | H04L 12/1845 |

FOREIGN PATENT DOCUMENTS

| | | |
|---|---|---|
| JP | 2005010619 A | 1/2005 |
| JP | 2006276554 A | 10/2006 |
| JP | 2013114584 A | 6/2013 |
| JP | 2013229725 A | 11/2013 |
| JP | 2015211303 A | 11/2015 |
| WO | 2015000494 A1 | 1/2015 |

OTHER PUBLICATIONS

Office Action issued in Japanese Appln. No. 2019-547839 dated Mar. 2, 2021. English machine translation provided.
International Search Report issued in Intl. Appln. No PCT/JP2017/036791 dated Dec. 19, 2017. English translation provided.
Written Opinion issued in Intl. Appln. No. PCT/JP2017/036791 dated Dec. 19, 2017.

* cited by examiner

*Primary Examiner* — Joseph Saunders, Jr.
(74) *Attorney, Agent, or Firm* — Rossi, Kimms & McDowell LLP

(57) ABSTRACT

In a microphone authentication method, a sound emitting device sends authentication information to a sound collecting device. The sound collecting device receives the authentication information and sends a collected sound signal to the sound emitting device. The sound emitting device receives the collected sound signal sent from the sound collecting device that has received the authentication information within a partitioned space. The sound emitting device emits a sound based on the collected sound signal.

20 Claims, 15 Drawing Sheets

SOUND EMITTING DEVICE, SOUND COLLECTING DEVICE, MICROPHONE AUTHENTICATION SYSTEM, AND MICROPHONE AUTHENTICATION METHOD

CROSS REFERENCE TO RELATED APPLICATIONS

The present application is a continuation of International Application No. PCT/JP2017/036791, filed on Oct. 11, 2017, the entire contents of which are incorporated herein by reference.

BACKGROUND OF THE INVENTION

1. Field of the Invention

A preferred embodiment of the present invention relates to a sound emitting device, a sound collecting device, a microphone authentication system, and a microphone authentication method, and more particularly relates to a sound emitting device, a sound collecting device, a microphone authentication system, and a microphone authentication method that use authentication information.

2. Description of the Related Art

Conventionally, a sound collecting system and a sound reproducing system that achieve microphone array processing and speaker array processing by adding an acoustic device as necessary are known (Japanese Unexamined Patent Application Publication No. 2015-211303, for example). The sound collecting system and the sound reproducing system (a voice collection and reproduction system) disclosed in Japanese Unexamined Patent Application Publication No. 2015-211303 use a voice collection and reproduction technology consisting of processing of a host unit and processing of a client unit.

The voice collection and reproduction system of Japanese Unexamined Patent Application Publication No. 2015-211303 includes a host unit and a client unit, and achieves a voice collection and reproduction function by linking the host unit and the client unit. The voice collection and reproduction system of Japanese Unexamined Patent Application Publication No. 2015-211303 includes two or more voice collection and reproduction systems that are connected to one another by a communication network.

As the number of sound collecting devices increases, authentication between devices becomes troublesome. A wireless communication system of Japanese Unexamined Patent Application Publication No. 2015-211303 is not able to solve such a problem.

SUMMARY OF THE INVENTION

In view of the foregoing, a preferred embodiment of the present invention is directed to provide a sound emitting device, a sound collecting device, a microphone authentication system, and a microphone authentication method that are able to easily authenticate a sound collecting device.

A sound emitting device according to a preferred embodiment of the present invention includes a communicator, a collected sound receiver, and a sound emitter. The communicator sends authentication information. The collected sound receiver receives a collected sound signal sent from a sound collecting device that has received the authentication information sent by the communicator. The sound emitter emits a sound based on the collected sound signal.

A sound emitting device, a sound collecting device, a microphone authentication system, and a microphone authentication method according to a preferred embodiment of the present invention are able to easily authenticate a sound collecting device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
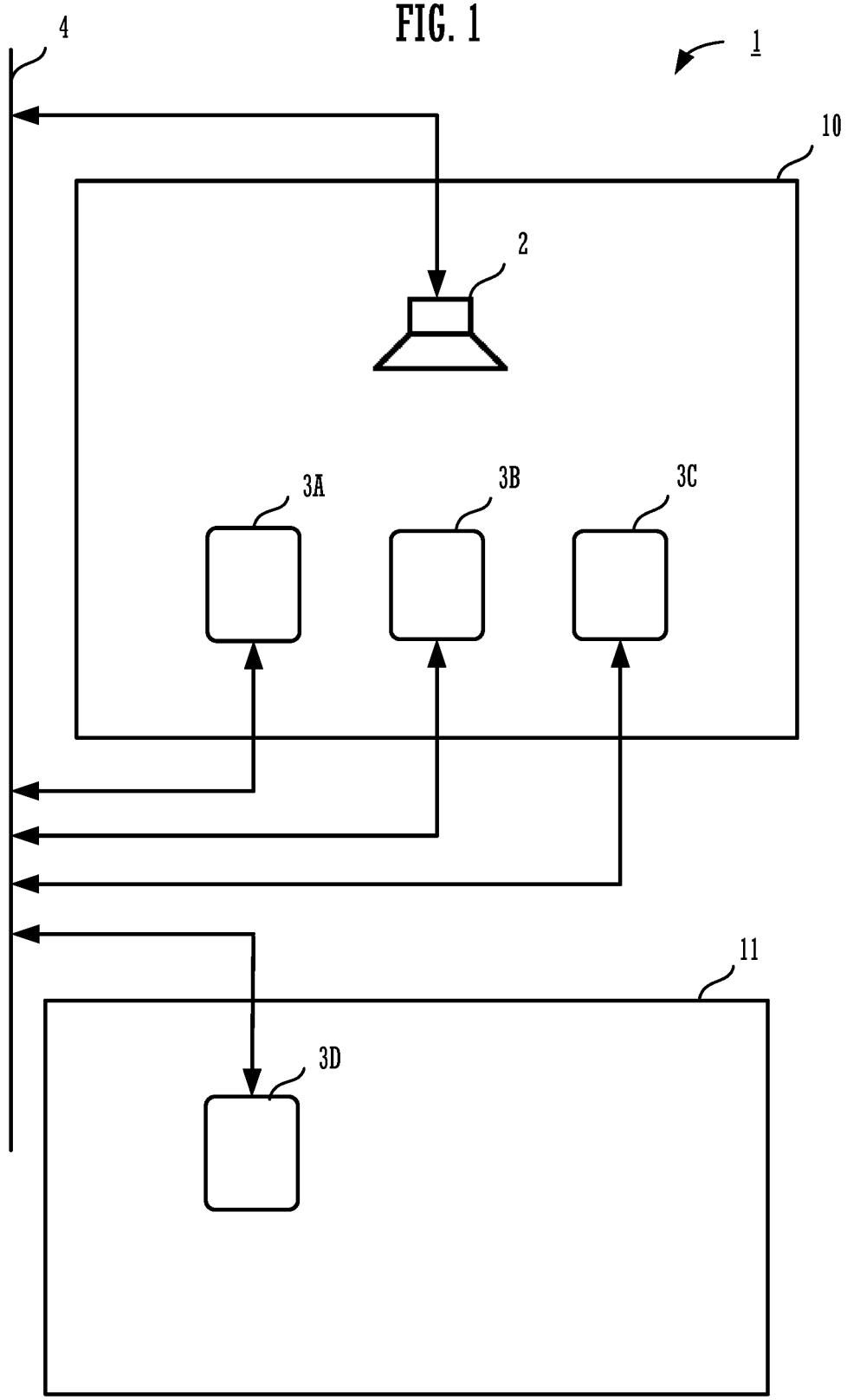
FIG. 1 is a schematic diagram illustrating an example of a space in which a microphone authentication system is provided.

A sound emitting device 2, a plurality of sound collecting devices 3A, 3B, 3C, and 3D, a microphone authentication system 1, and a microphone authentication method according to the present preferred embodiment of the present invention will be described with reference to the drawings. FIG. 1 is a schematic diagram illustrating a space (a closed space 10, and a space 11) in which the microphone authentication system 1 is provided.

The microphone authentication system 1, as shown in FIG. 1, includes a sound emitting device 2, and a plurality (four) of sound collecting devices 3A, 3B, 3C, and 3D. The microphone authentication system 1 is used in a closed space 10 partitioned by a wall or the like, such as a recording studio or a conference room, for example. In the microphone authentication system 1, the sound emitting device 2, and the plurality of sound collecting devices 3A, 3B, 3C, and 3D are connected to one another through a network 4.

The three sound collecting devices 3A, 3B, and 3C are placed (disposed) within the closed space 10. In addition, the sound collecting device 3D is placed in a different space 11 outside the closed space 10.

The sound emitting device 2 according to the present preferred embodiment is a speaker unit, for example. In addition, each of the plurality of sound collecting devices 3A, 3B, 3C, and 3D according to the present preferred embodiment is a microphone, a portable terminal, or the like that has a sound collecting function.

Figure 2:
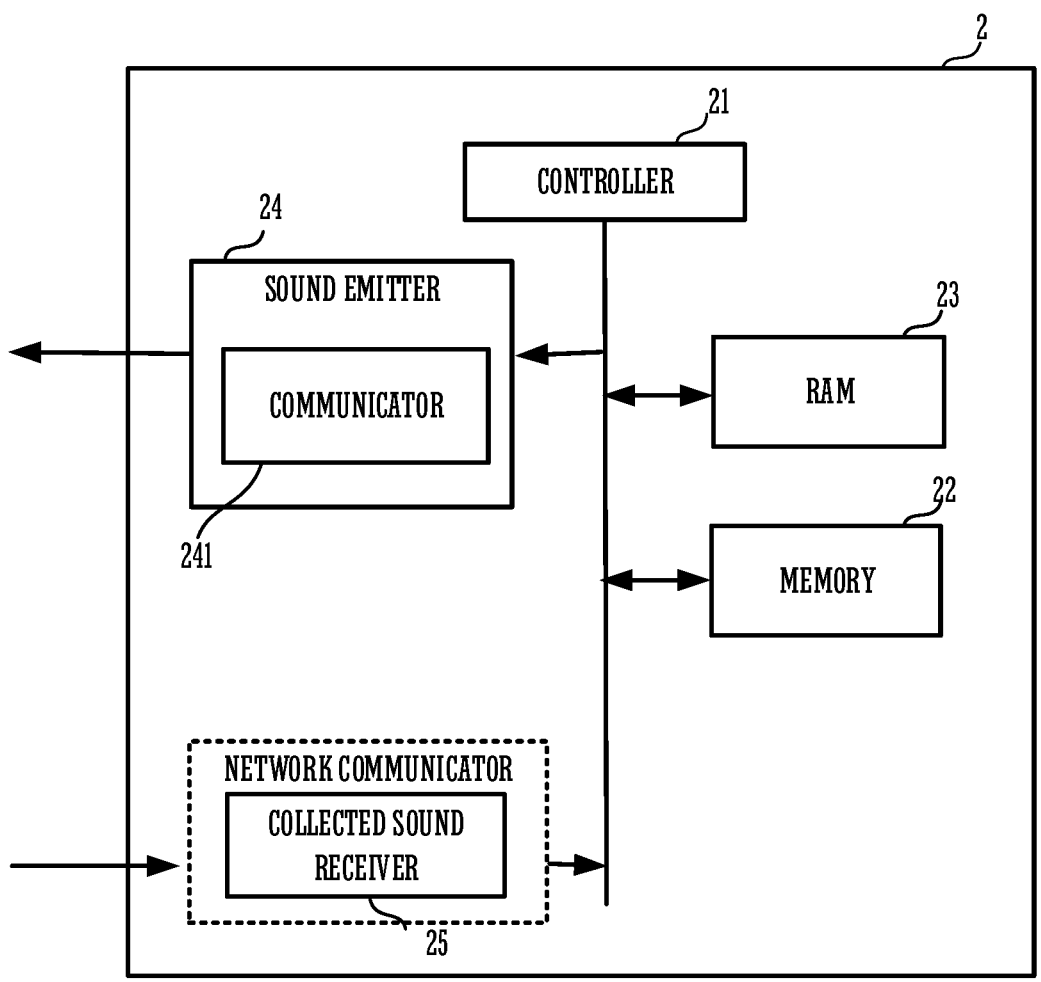
FIG. 2 is a block configuration diagram showing a configuration of a sound emitting device.

The sound emitting device 2 will be described with reference to FIG. 2. FIG. 2 is a block configuration diagram showing a configuration of the sound emitting device 2. The sound emitting device 2, as shown in FIG. 2, includes a controller 21, a memory 22, a RAM 23, a sound emitter 24, and a collected sound receiver 25.

The controller 21 controls an operation of the sound emitting device 2. The controller 21 performs various types of operations by reading various programs stored in the memory 22 out to the RAM 23, and executing the programs.

The memory 22 is a flash memory, for example. The memory 22 stores various programs and various types of information.

The sound emitter 24 emits a sound based on a collected sound signal sent from the sound collecting device (the sound collecting device 3A, 3B, or 3C, for example) that has received authentication information. The sound emitter 24 includes a DSP, a D/A converter, and a speaker. The sound emitter 24 appropriately performs signal processing including filtering and analogue conversion, to the received collected sound signal. The sound emitter 24 emits a sound based on an audio signal obtained by performing signal processing on a collected sound signal. In addition, the sound emitter 24 has a communicator 241.

The communicator 241 sends authentication information by a communication function in which a transmittable range is limited to an inside of a partitioned space. More specifically, the communicator 241 sends authentication information to the plurality of sound collecting devices 3A, 3B, and 3C placed within the same space as the closed space 10 in which the sound emitting device 2 is placed (see FIG. 1). The communication function in which a transmittable range is limited to an inside of a partitioned space is a function that uses a sound, for example. The communicator 241 modulates the authentication information and places the modulated authentication information on the sound being a carrier wave. The closed space 10 is partitioned by a wall or the like, so that, as long as the signal is an audio signal of which the transmittable range is limited to the inside of the closed space 10, the audio signal that the communicator 241 sends does not leak out of the closed space 10. In short, the communicator 241 sends the authentication information using an audio signal in a range in which the signal reaches only the sound collecting devices 3A, 3B, and 3C placed within the same closed space 10 as the sound emitting device 2. In other words, the audio signal that the communicator 241 has sent does not reach the sound collecting device 3D placed in the different space 11. In short, the sound collecting device 3D is not able to receive the authentication information. It is to be noted that the closed space does not mean that the space is strictly closed. For example, even in a case in which a door, a window, or the like is open, such a case corresponds to the closed space 10.

It is to be noted that the communicator 241 may send the authentication information by a short-distance communication function (such as Bluetooth (registered trademark), NFC (Near Field Communication), or a wireless LAN of the IEEE802.11ad standard). In addition, since the transmission range of the sound is able to be comparatively easily restricted to a short distance by reducing an output level, the sound also corresponds to the short-distance communication function.

It is to be noted that the authentication information is identifiable information for specifying the sound emitting device 2, such as an IP address, for example. In addition, the communicator 241 sends an audio signal from a speaker (not shown) of the sound emitter 24. However, the communicator 241 may send the authentication information by a light signal using a light emitter aside from the speaker for outputting an audio signal. The communication function using light is also an example of the communication function in which the transmittable range is limited to the inside of a partitioned space.

Figure 3:
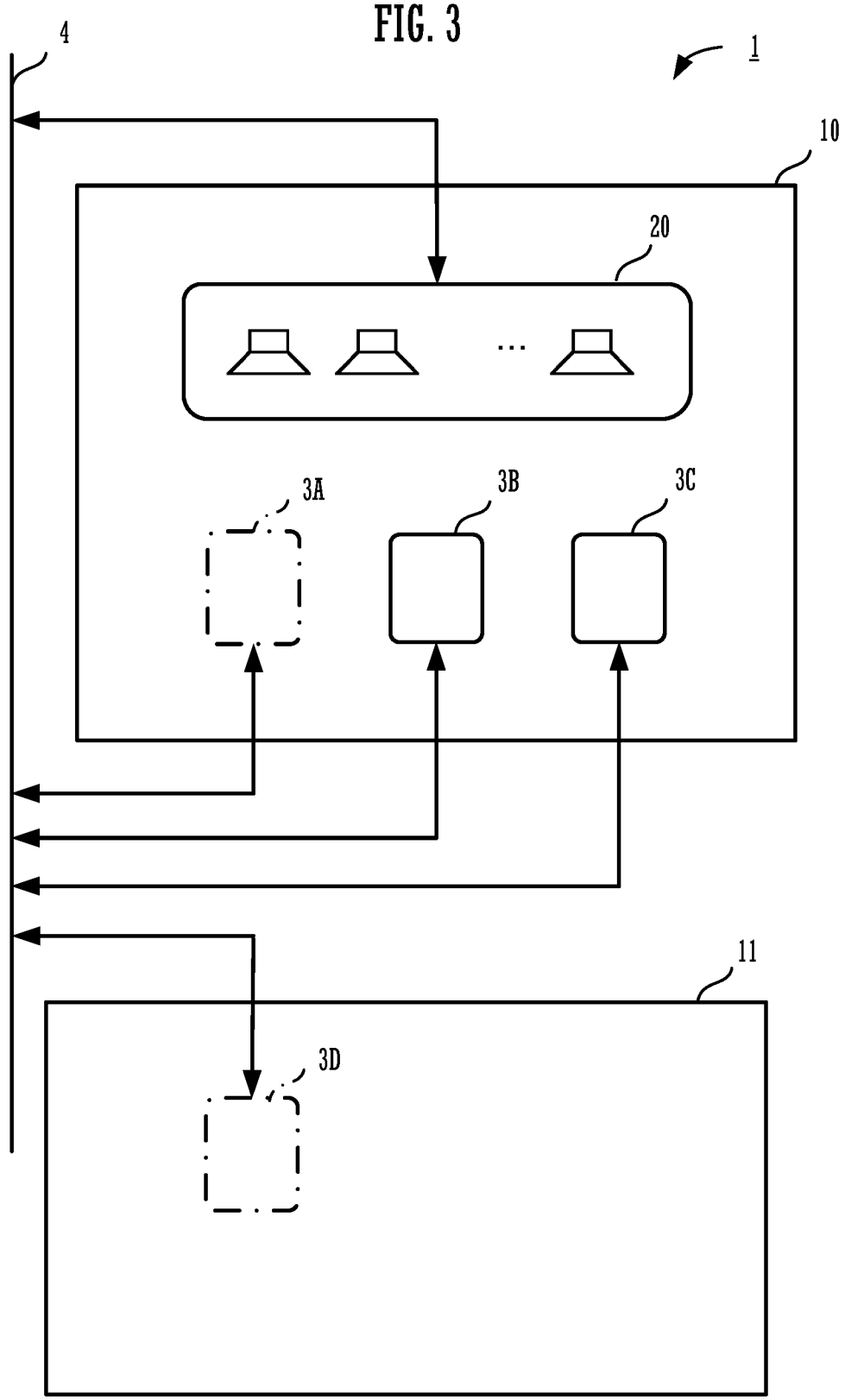
FIG. 3 is a schematic diagram illustrating an example of a space in which a microphone authentication system is provided, the example being different from the example shown in FIG. 1.

In addition, as shown in FIG. 3, the communicator 241 may send the authentication information using a plane wave speaker or an array loudspeaker that are capable of providing a directivity to the sound. The communicator 241, by providing a directivity to the audio signal, is able to send the authentication information only within a specific range. FIG. 3 is a schematic diagram illustrating an example of a space (the closed space 10) in which the microphone authentication system is provided, the example being different from the example shown in FIG. 1. For example, the sound emitting device 20 that sends an audio signal by an array speaker sends authentication information only to the sound collecting devices 3B and 3C by an audio signal having a directivity. In short, the sound collecting device 3A, although being placed within the same closed space 10 as the sound emitting device 20, is not able to receive the authentication information. As a result, only a desired sound collecting device among the sound collecting devices 3A, 3B, and 3C placed within the closed space 10 is able to receive the authentication information.

The collected sound receiver 25, as shown in FIG. 2, receives a collected sound signal from the sound collecting devices 3A, 3B, and 3C through the network 4. The sound collecting devices 3A, 3B, and 3C are sound collecting devices placed within the same space as the same closed space 10 of the sound emitting device 2, that is, the sound collecting devices 3A, 3B, and 3C that have received the authentication information sent from the communicator 241 (see FIG. 1).

Figure 4:
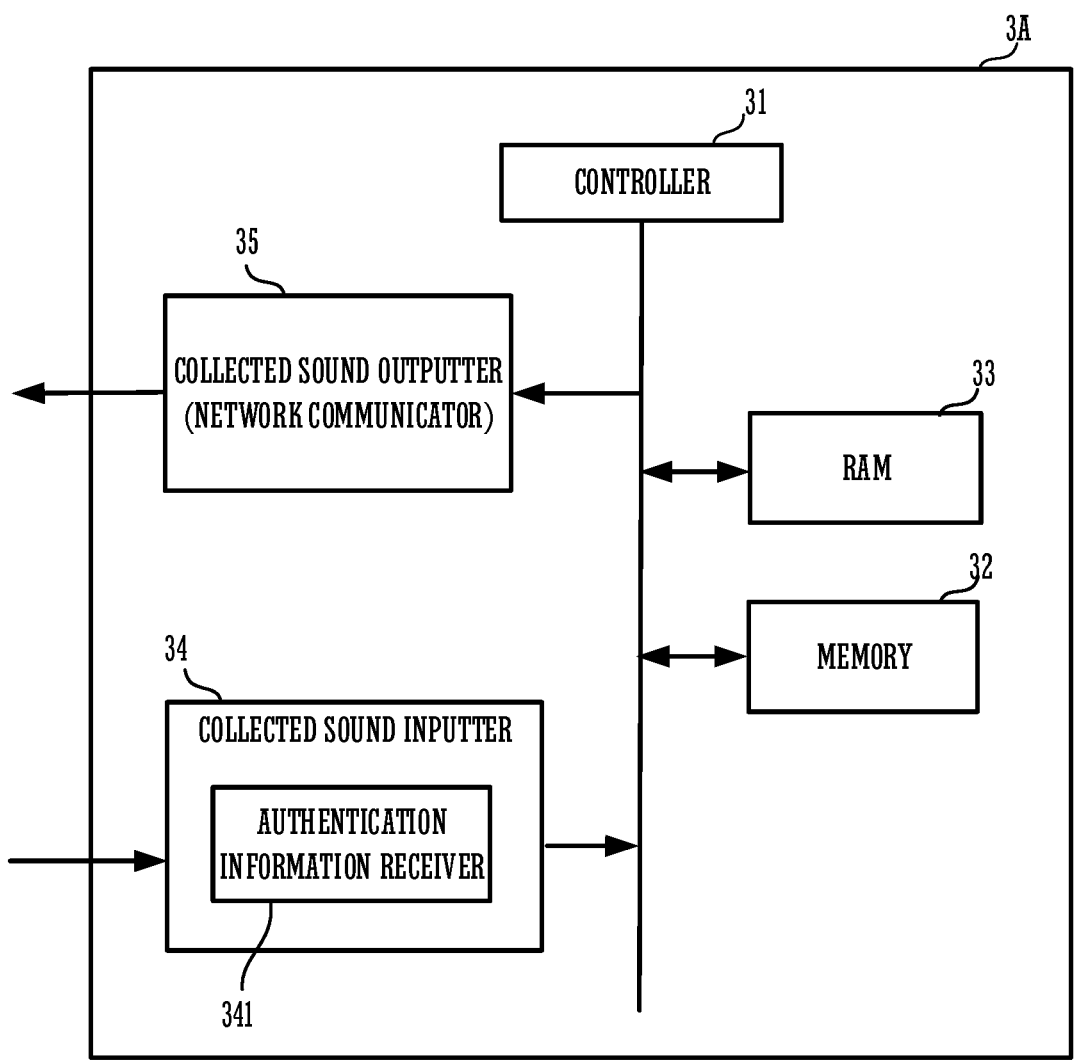
FIG. 4 is a block configuration diagram showing a configuration of a sound collecting device.

The plurality of sound collecting devices 3A, 3B, 3C, and 3D will be described with reference to FIG. 4. FIG. 4 is a block configuration diagram showing a configuration of the sound collecting devices 3A, 3B, 3C, and 3D. It is to be noted that the sound collecting device 3A will be described as a representative of the plurality of sound collecting devices 3A, 3B, 3C, and 3D. All the sound collecting devices 3B, 3C, and 3D have the same structure as the sound collecting device 3A shown in FIG. 4.

The sound collecting device 3A, as shown in FIG. 4, includes a controller 31, a memory 32, a RAM 33, a collected sound inputter 34, and a collected sound outputter 35.

The controller 31 controls an operation of the sound collecting device 3A. The controller 31 performs various types of operations by reading various programs stored in the memory 32 out to the RAM 33, and executing the programs.

The memory 32 is a flash memory, for example. The memory 32 stores various programs and various types of information.

The collected sound inputter 34 collects (obtains) a surrounding sound. The collected sound inputter 34 includes a filter and an A/D converter. The collected sound inputter 34 appropriately performs filtering processing and digital conversion on the obtained sound. In addition, the collected sound inputter 34 includes an authentication information receiver 341.

The authentication information receiver 341 receives authentication information sent from the sound emitting device 2. More specifically, the authentication information receiver 341 receives an audio signal that the communicator 241 of the sound emitting device 2 has sent. The authentication information receiver 341 demodulates the received audio signal, and extracts the authentication information. The authentication information is stored in the memory 32.

The collected sound outputter 35 sends a collected sound signal obtained by performing signal processing on the sound obtained by the collected sound inputter 34. The collected sound outputter 35, based on the authentication information stored in the memory 32, sends a collected sound signal to the sound emitting device 2 corresponding to the authentication information through the network 4.

Incidentally, in the sound emitting device 2, the controller 21 may achieve the function of the communicator 241. In such a case, the memory 22 stores a program for achieving the function of the communicator 241.

Figure 5:
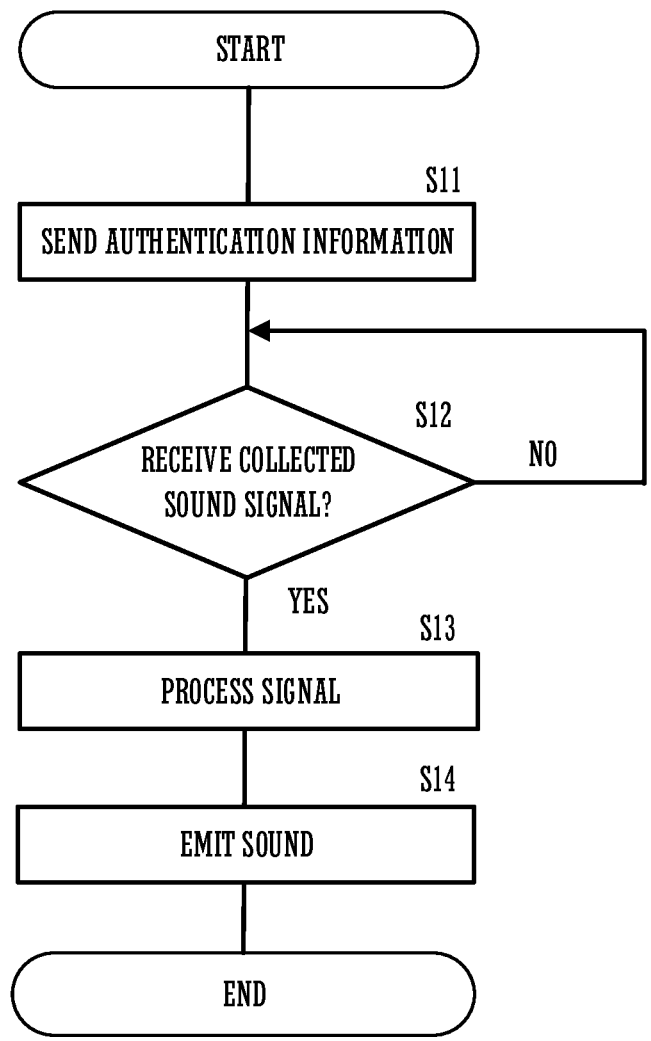
FIG. 5 is a flow chart showing an operation of the sound emitting device.

The operation of the sound emitting device 2 will be described with reference to FIG. 5. FIG. 5 is a flow chart showing the operation of the sound emitting device 2.

The sound emitting device 2 sends authentication information by an audio signal of which the transmittable range is limited to the inside of a partitioned space 10 (S11). The sound emitting device 2, when receiving the collected sound signal sent from each of the plurality of sound collecting devices 3A, 3B, and 3C that have received the authentication information within the closed space 10 (S12: YES), performs signal processing on the received collected sound signal (S13). The sound emitting device 2 emits a sound based on the audio signal obtained by performing the signal processing on the collected sound signal (S14).

In the sound collecting devices 3A, 3B, and 3C, the controller 31 may achieve the function of the authentication information receiver 341. In such a case, the memory 32 stores a program so that the controller 31 may achieve the function of the authentication information receiver 341.

Figure 6:
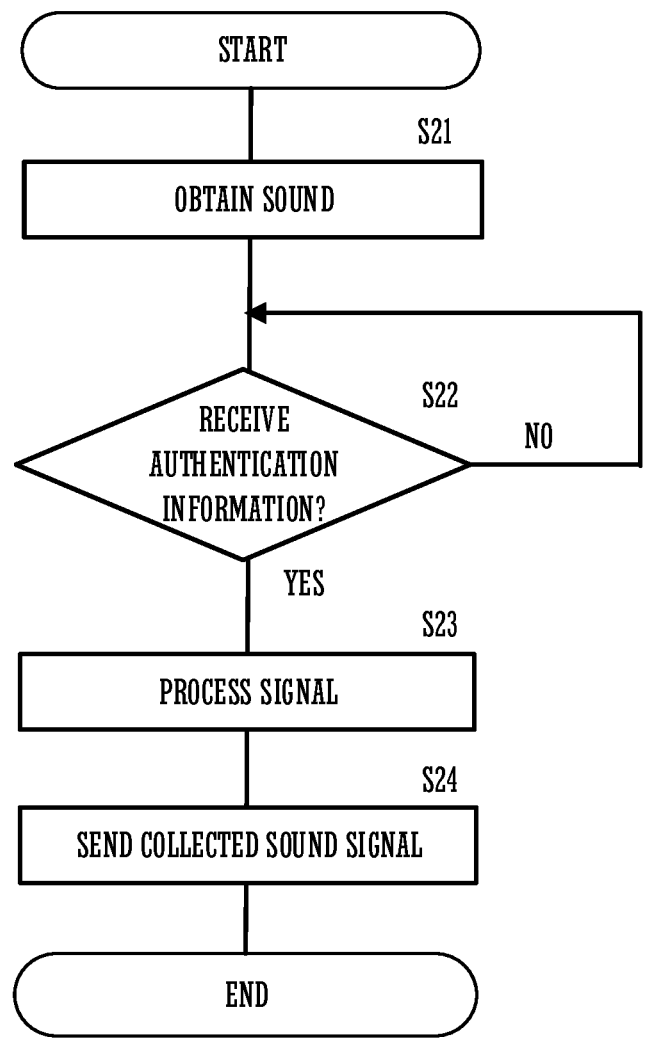
FIG. 6 is a flow chart showing an operation of the sound collecting device.

The operation of the sound collecting devices 3A, 3B, and 3C placed within the same closed space 10 as the sound emitting device 2 will be described with reference to FIG. 6. FIG. 6 is a flow chart showing the operation of the sound collecting devices 3A, 3B, and 3C. It is to be noted that the sound collecting device 3A will be described below as a representative. The operation of the sound collecting devices 3B and 3C is the same as the operation of the sound collecting device 3A. In addition, the sound collecting device 3D performs the same operation as the sound collecting device 3A, for example, when the sound collecting device 3D is placed within the closed space 10.

The sound collecting device 3A obtains a surrounding sound (S21). The sound collecting device 3A receives an audio signal sent from the sound emitting device 2 placed within the same closed space 10, and, when demodulating the audio signal and taking an authentication signal (S22: YES), performs signal processing on the obtained sound (S23). The sound collecting device 3A, based on authentication information, sends a collected sound signal obtained by performing the signal processing on the sound, to the sound emitting device 2 corresponding to the authentication information (S24).

Figure 7:
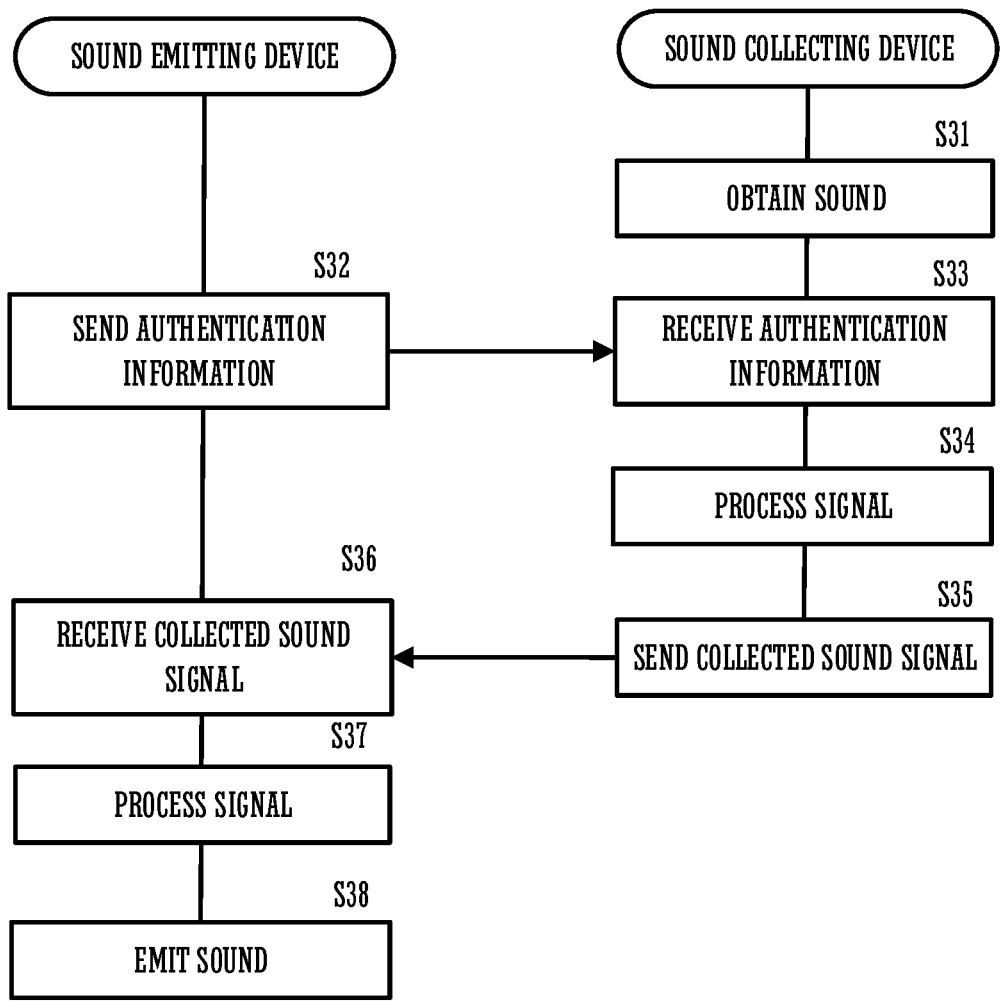
FIG. 7 illustrates communication between the sound emitting device and the sound collecting device.

Communication between the sound emitting device 2 and the sound collecting devices 3A, 3B, and 3C will be described with reference to FIG. 7. FIG. 7 illustrates communication between the sound emitting device 2 and the sound collecting devices 3A, 3B, and 3C. It is to be noted that, while the sound collecting device 3A is described as a representative, the sound collecting devices 3B and 3C also communicate with the sound emitting device 2 in the same procedure as the sound collecting device 3A. On the other hand, the sound collecting device 3D is placed in the different space 11 from the closed space 10 (see FIG. 1), so that, although the sound collecting device 3D is connected to the sound emitting device 2 in the network 4, an audio signal does not reach the sound collecting device 3D from the sound emitting device 2, and the sound collecting device 3D does not send a collected sound signal to the sound emitting device 2.

In the microphone authentication system 1, the sound collecting device 3A obtains a surrounding sound (S31). The sound emitting device 2 sends authentication information by an audio signal obtained by modulating the authentication information (S32). The sound collecting device 3A receives the authentication information from the audio signal (S33). The sound collecting device 3A performs signal processing on the obtained sound (S34). The sound collecting device 3A, based on the authentication information, sends through the network 4 the collected sound signal obtained by performing the signal processing on the sound, to the sound emitting device 2 corresponding to the authentication information (S35). The sound emitting device 2 receives the collected sound signal (S36). The sound emitting device 2 performs signal processing on the received collected sound signal (S37). The sound emitting device 2 emits a sound based on an audio signal obtained by performing the signal processing on the collected sound signal (S38).

In the microphone authentication system 1 according to the present preferred embodiment, the sound emitting device 2 sends authentication information to the plurality of sound collecting devices 3A, 3B, and 3C placed within the same closed space 10 by the audio signal of which the transmittable range is limited within the closed space 10. In short, the authentication information of the sound emitting device 2 placed within the closed space 10 does not reach the sound collecting device 3D placed outside the closed space 10. As a result, in the microphone authentication system 1 according to the present preferred embodiment, it is possible to easily authenticate the sound collecting devices 3A, 3B, and 3C. In short, in the microphone authentication system 1 according to the present preferred embodiment, it is possible to prevent the sound emitting device 2 from emitting a sound that the sound collecting device 3D accidentally has collected.

It is to be noted that, in the microphone authentication system 1, two or more sound emitting devices 2 may be placed within the closed space 10. In addition, in the microphone authentication system 1, the number of sound collecting devices placed within the closed space 10 is not limited to three. Further, in the microphone authentication system 1, the present invention is not limited to the example in which the sound emitting device 2 and the plurality of sound collecting devices 3A, 3B, 3C, and 3D are connected to one another through the network 4. In the microphone authentication system 1, the sound emitting device 2 and the plurality of sound collecting devices 3A, 3B, 3C, and 3D may be connected to one another by communication using a cable, a USB, or the like, or communication using a specific frequency such as the ISM (Industrial Scientific Medical) band. In a case in which the sound emitting device 2 and the sound collecting devices 3A, 3B, 3C, and 3D communicate to each other using a specific frequency such as the ISM band, the sound emitting device 2 preferably sends information in an encryption scheme as authentication information.

In addition, the sound emitting device 2 may include a plurality of antennas, and may perform beam forming by using a phased array antenna or the like that is able to adjust a transmission phase with respect to each antenna of the plurality of antennas. For example, the sound emitting device 2 may use a MU-MIMO (Multi User Multiple-Input Multiple-Output) function. In such a case, even radio waves are able to have a directivity, so that authentication information is able to be sent only within a specific range.

Furthermore, the sound emitting device 2 may be configured so as to be able to change the intensity of an audio signal, a light signal, or radio waves that sends authentication information. In the sound collecting devices 3A, 3B, 3C, and 3D, the controller 31, based on the authentication information that the authentication information receiver 341 has received, determines whether to authenticate the sound emitting device 2, depending on the intensity of an audio signal, a light signal, or radio waves. For example, the sound collecting devices 3A, 3B, 3C, and 3D may previously store a desired threshold value with respect to an audio signal, a light signal, or radio waves, and, only when the intensity of the audio signal, the light signal, or the radio waves exceeds the threshold value, the sound emitting device 2 may be configured to be able to receive authentication information. In addition, for example, in a case in which the sound emitting device 2 sends authentication information by an audio signal, a light signal, or radio waves of which the intensity is lower than the threshold value, while the authentication information receiver 341 of the sound collecting devices 3A, 3B, 3C, and 3D receives the authentication information, the controller 31 may be configured so as not to authenticate the sound emitting device 2. Furthermore, for example, in a case in which the authentication information receiver 341 of each of the sound collecting devices 3A, 3B, 3C, and 3D receives the authentication information by the audio signal, the light signal, or the radio waves of which the intensity is lower than the threshold value, the controller 31 may be configured so as not to authenticate the sound emitting device 2. It is to be noted that, in the above-described case, the sound collecting devices 3A, 3B, 3C, and 3D may store a different threshold value.

First Modification

Figure 8:
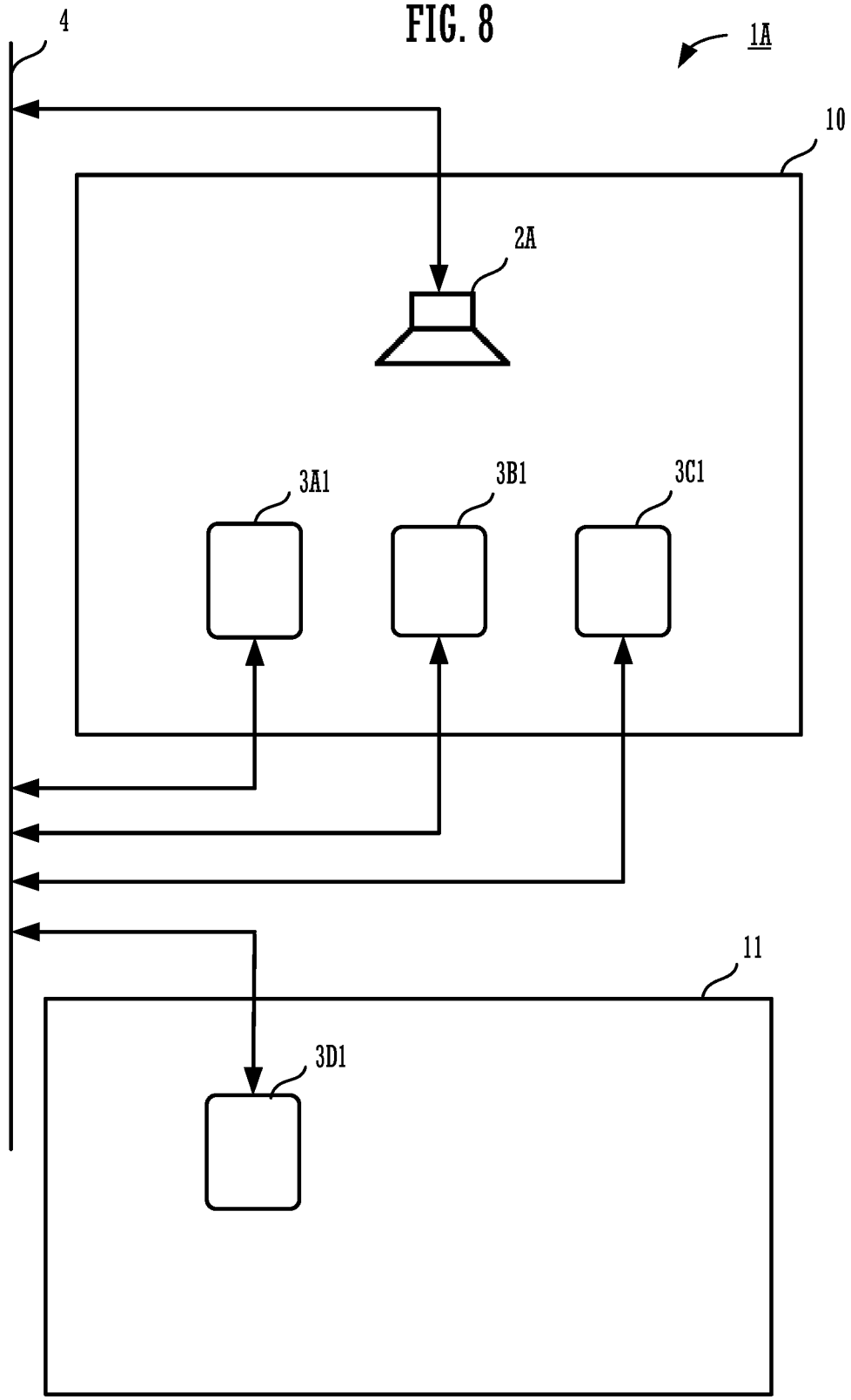
FIG. 8 is a schematic diagram illustrating an example of a space in which a microphone authentication system of a first modification is provided.
Figure 9:
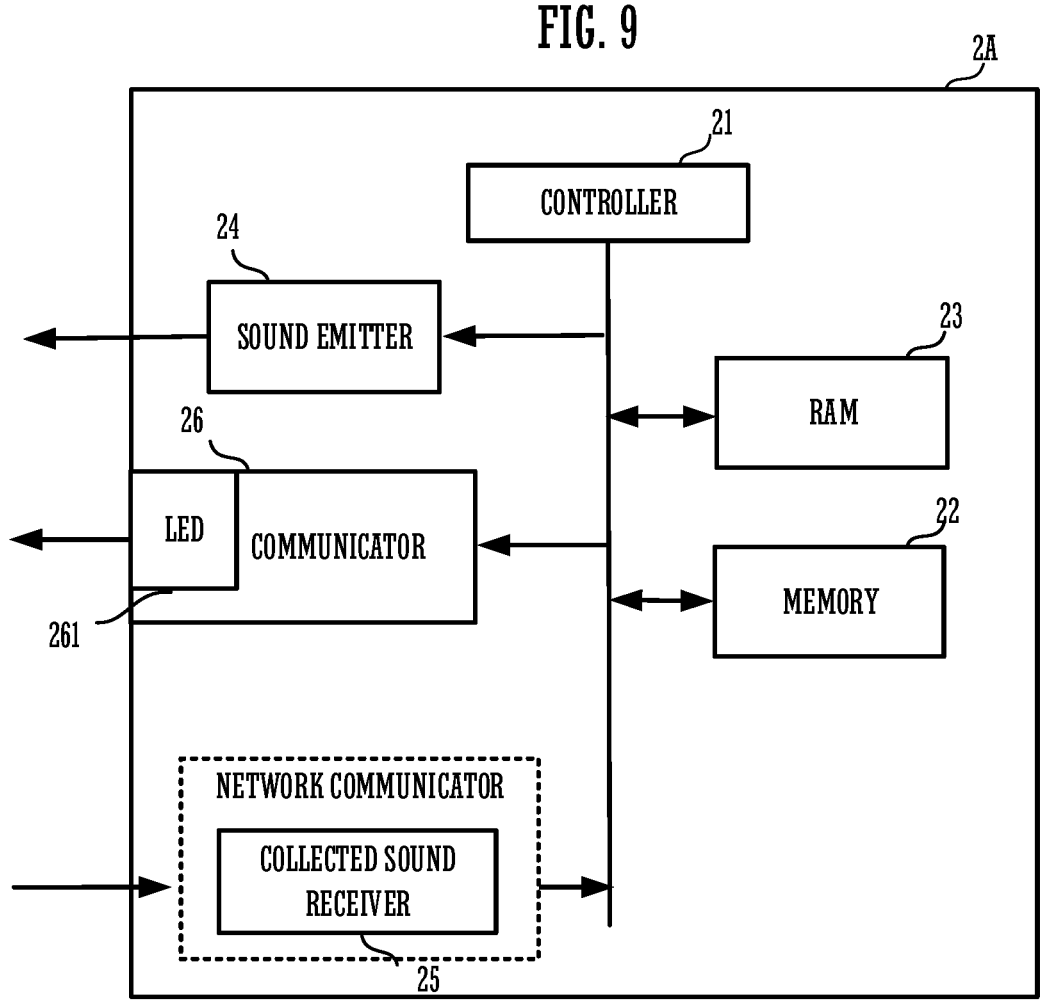
FIG. 9 is a block configuration diagram showing a configuration of a sound emitting device of the first modification.
Figure 10:
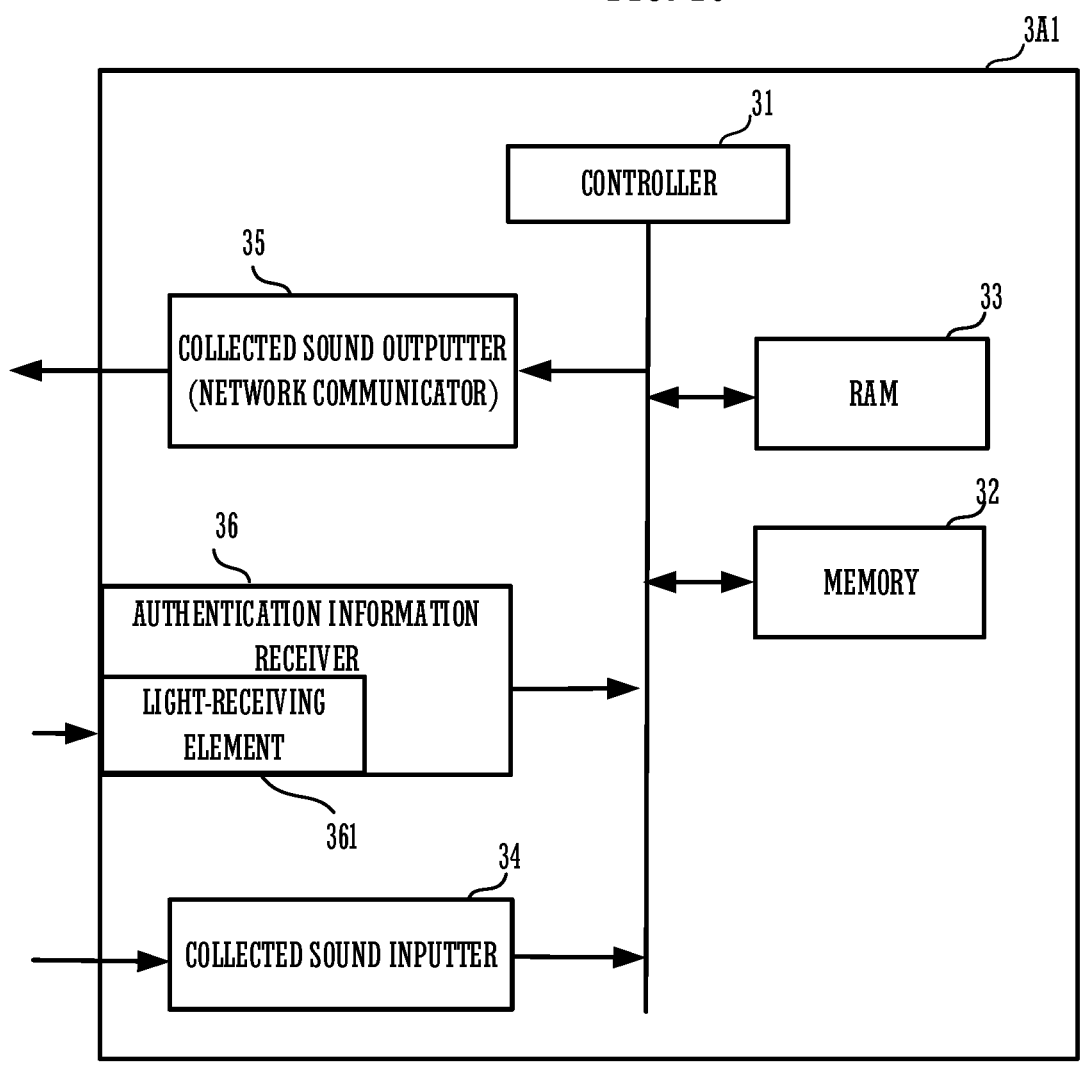
FIG. 10 is a block configuration diagram showing a configuration of a sound collecting device of the first modification.

A sound emitting device 2A, sound collecting devices 3A1, 3B1, and 3C1, and a microphone authentication system 1A according to a first modification of the present preferred embodiment of the present invention will be described with reference to FIG. 8 to FIG. 10. FIG. 8 is a schematic diagram illustrating an example of a space in which the microphone authentication system 1A of the first modification is provided. FIG. 9 is a block configuration diagram showing a configuration of the sound emitting device 2A of the first modification. FIG. 10 is a block configuration diagram showing a configuration of the sound collecting device 3A1 of the first modification. In FIG. 10, while the sound collecting device 3A1 of the first modification is described as a representative, the sound collecting devices 3B1, 3C1, and 3D1 of the first modification have the same configurations as the sound collecting device 3A1.

The sound emitting device 2A of the first modification, as shown in FIG. 8, sends authentication information to the sound collecting devices 3A1, 3B1, and 3C1 placed within the same closed space 10, by a light signal. The communicator 26 of the sound emitting device 2A of the first modification sends the authentication information put on light being a carrier wave.

In the sound emitting device 2A, as shown in FIG. 9, the communicator 26 is configured separately from the sound emitter 24. The sound emitting device 2A includes a light-emitting element 261 that emits light to outside. The communicator 26, by causing the light-emitting element 261 to emit light, sends authentication information to the plurality of sound collecting devices 3A1, 3B1, and 3C1 placed within the same closed space 10.

In each of the plurality of sound collecting devices 3A1, 3B1, and 3C1, as shown in FIG. 10, an authentication information receiver 36 is configured separately from the collected sound inputter 34. The authentication information receiver 36 of each of the plurality of sound collecting devices 3A1, 3B1, and 3C1 includes a light-receiving element 361 that receives light that the sound emitting device 2A has emitted. The authentication information receiver 36 of each of the sound collecting devices 3A1, 3B1, and 3C1 demodulates a light signal received by the light-receiving element 361 and receives the authentication information.

The sound emitting device 2A of the first modification sends authentication information using light. As a result, even when the closed space 10 is partitioned not by a wall but by, for example, a curtain or the like, the authentication information of the sound emitting device 2A placed within the closed space 10 does not reach the sound collecting device 3D1 placed outside the closed space 10. Therefore, in the microphone authentication system 1A of the first modification, it is possible to prevent the sound emitting device 2A from emitting a sound that the sound collecting device 3D1 placed outside the closed space 10 has collected.

It is to be noted that the sound emitting device 2A may provide a directivity to a light signal and send authentication information. In such a case, light-emitting elements may be arranged in an array or the like to provide a directivity to a light signal, which makes it possible to send authentication information only to a desired sound collecting device among the plurality of sound collecting devices 3A1, 3B1, and 3C1 placed in the same closed space 10.

Second Modification

Figure 11:
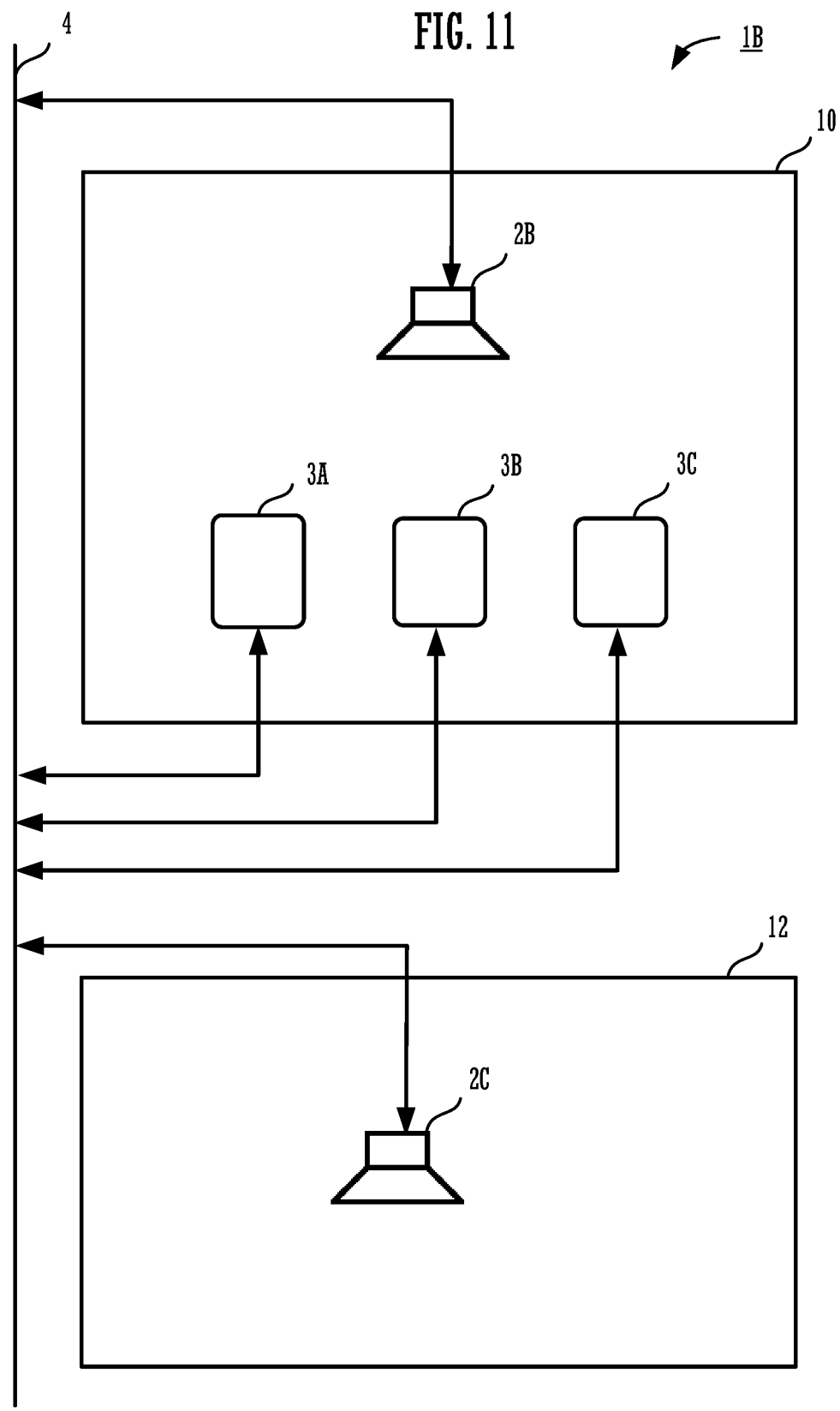
FIG. 11 is a schematic diagram illustrating an example of a space in which a microphone authentication system of a second modification is provided.

A microphone authentication system 1B according to a second modification of the present preferred embodiment of the present invention will be described with reference to FIG. 11. FIG. 11 is a schematic diagram illustrating an example of a space in which the microphone authentication system 1B of the second modification is provided.

In the microphone authentication system 1B of the second modification, as shown in FIG. 11, a second sound emitting device 2C different from a first sound emitting device 2B placed within the closed space 10 is placed in a different space 12 from the closed space 10.

The first sound emitting device 2B and the second sound emitting device 2C are connected to each other through the network 4. The first sound emitting device 2B outputs authentication information by the short-distance communication function to the plurality of sound collecting devices 3A, 3B, and 3C placed within the closed space 10 in which the first sound emitting device 2B is placed. The authentication information includes both first authentication information that specifies the first sound emitting device 2B and second authentication information that specifies the second sound emitting device 2C. Each of the plurality of sound collecting devices 3A, 3B, and 3C receives authentication information including the first authentication information and the second authentication information by the authentication information receiver 341 (see FIG. 4). Each of the plurality of sound collecting devices 3A, 3B, and 3C, based on the authentication information, sends a collected sound signal to both the first sound emitting device 2B and the second sound emitting device 2C through the network 4.

Accordingly, the second sound emitting device 2C in the space 12 is able to receive the collected sound signal of the plurality of sound collecting devices 3A, 3B, and 3C placed within the closed space 10. Therefore, in the microphone authentication system 1B of the second modification, the second sound emitting device 2C placed in the different space 12 is able to emit a sound based on the collected sound signal of the specific sound collecting devices 3A, 3B, and 3C.

It is to be noted that, although the microphone authentication system 1B of the second modification provides an example in which the second sound emitting device 2C is placed in the different space 12, the second sound emitting device 2C is not limited to a device that has the same configuration or function as the first sound emitting device 2B. In short, in the microphone authentication system 1B of the second modification, a device that is connected to the network 4 and has a speaker unit may be in the different space 12. In addition, the first sound emitting device 2B and the second sound emitting device 2C are not limited to an example of being connected to each other through the network 4. The first sound emitting device 2B and the second sound emitting device 2C may electrically be connected to each other through a cable. Furthermore, each of the plurality of sound collecting devices 3A, 3B, and 3C placed within the closed space 10 may send a collected sound signal only to the second sound emitting device 2C.

Third Modification

Figure 12:
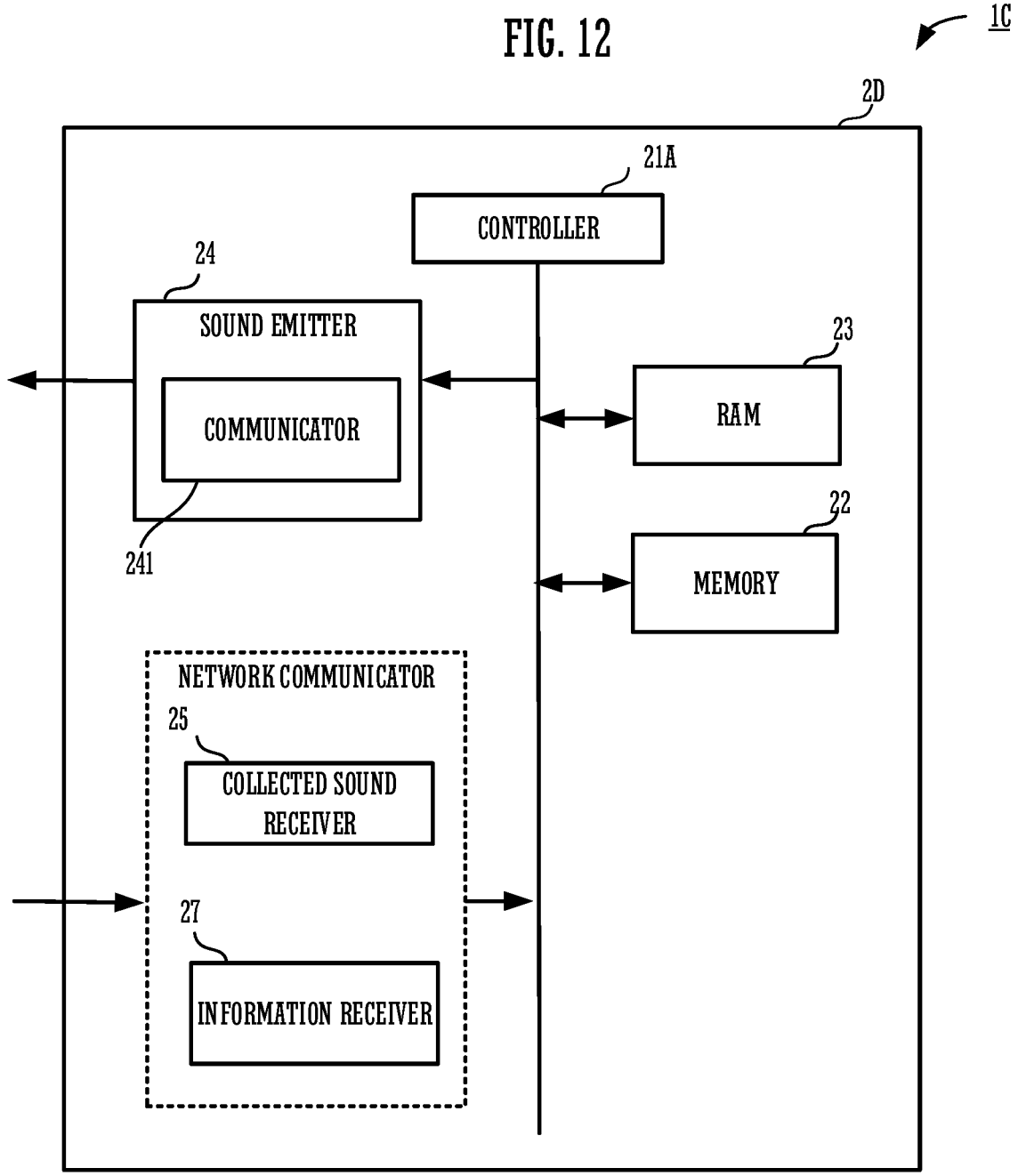
FIG. 12 is a block configuration diagram showing a configuration of a sound emitting device of a third modification.
Figure 13:
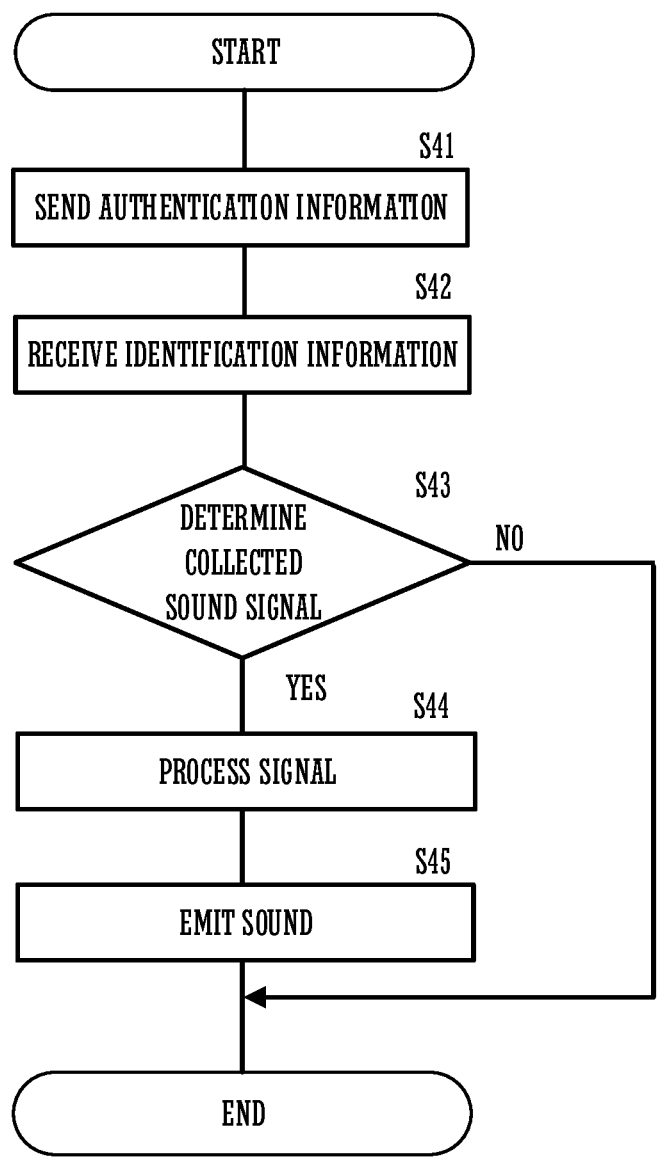
FIG. 13 is a flow chart showing an operation of the sound emitting device of the third modification.
Figure 14:
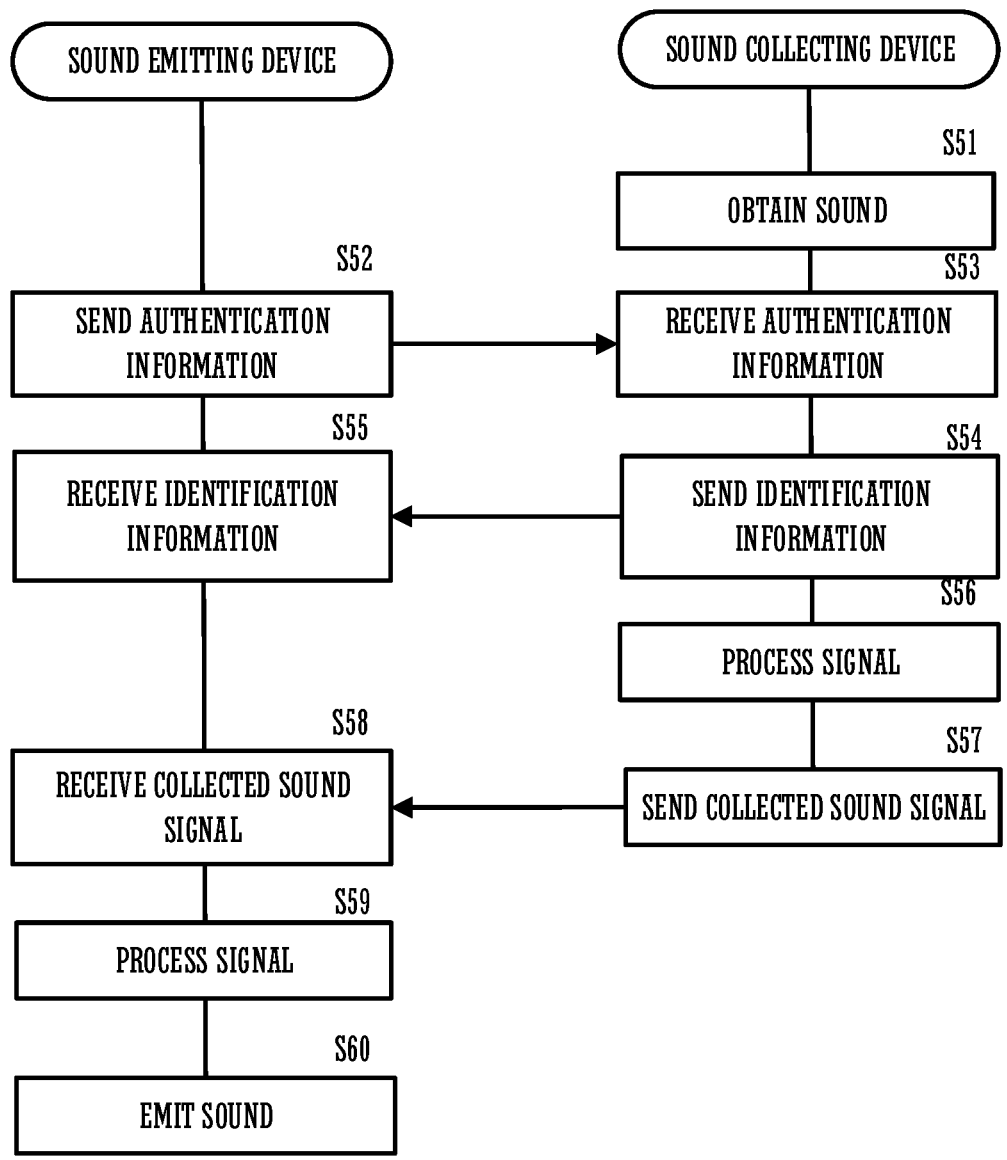
FIG. 14 illustrates communication between the sound emitting device of the third modification and the sound collecting device.
Figure 15:
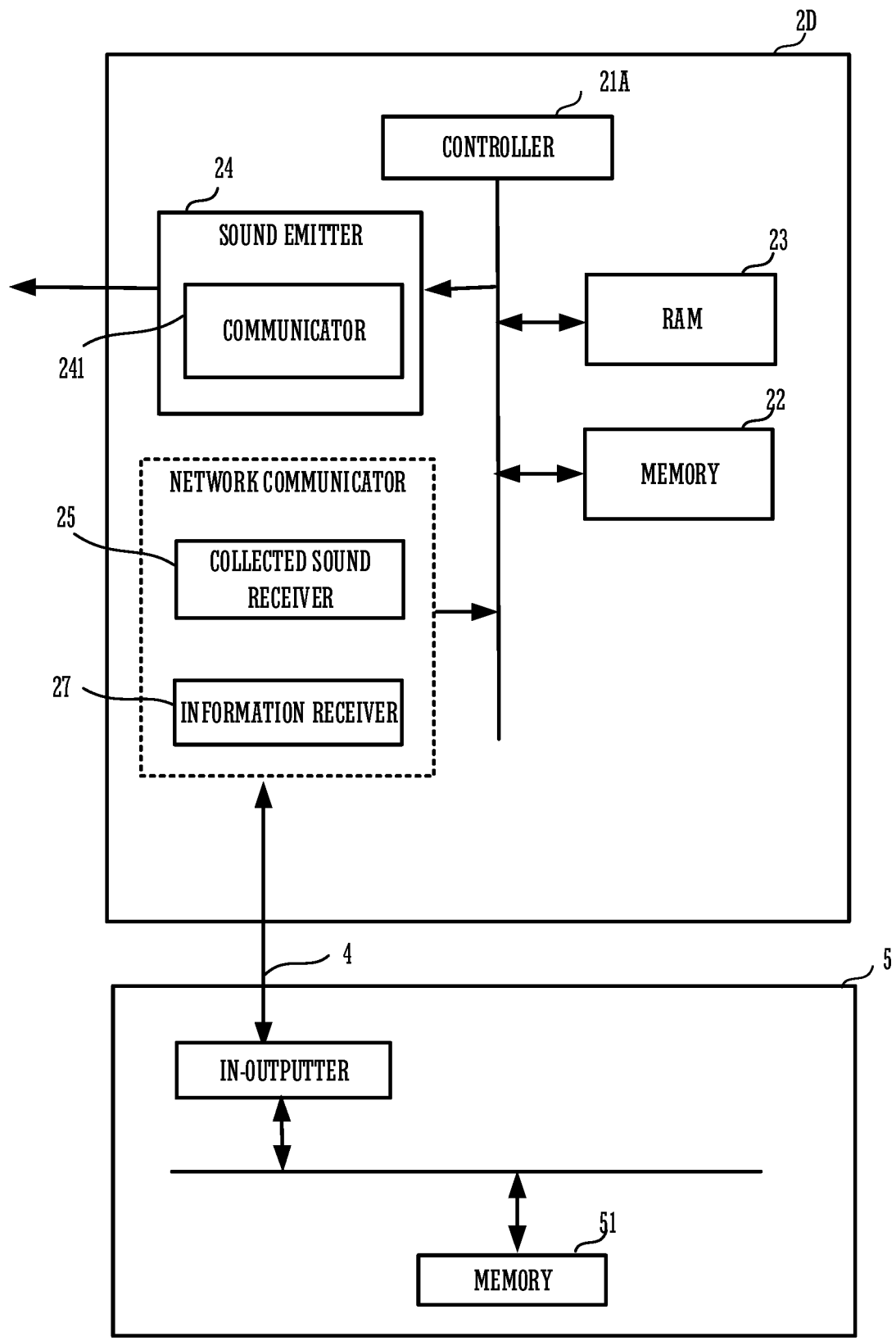
FIG. 15 is a block configuration diagram showing a configuration of the sound emitting device and a server.

A microphone authentication system 1C according to a third modification of the present preferred embodiment of the present invention will be described with reference to FIG. 12 to FIG. 15. FIG. 12 is a block configuration diagram showing a configuration of a sound emitting device 2D. FIG. 13 is a flow chart showing an operation of the sound emitting device 2D. FIG. 14 illustrates communication between the sound emitting device 2D and the sound collecting devices 3A, 3B, and 3C. FIG. 15 is a block configuration diagram showing a configuration of the sound emitting device 2D and a server 5.

The sound emitting device 2D, as shown in FIG. 12, includes an information receiver 27. The information receiver 27 receives identification information of the sound collecting devices 3A, 3B, and 3C (see FIG. 1) placed within the same closed space 10, through the network 4. The identification information is information to specify each of the sound collecting devices 3A, 3B, and 3C. The identification information includes an IP address, terminal information, or user information, for example. In addition, the controller 21A of the sound emitting device 2D determines whether to emit a sound based on identification information. Furthermore, the memory 22 of the sound emitting device 2D stores received identification information.

The operation of the sound emitting device 2D will be described with reference to FIG. 13. The sound emitting device 2D sends authentication information (S41). The sound emitting device 2D receives identification information through the network 4 from each of the plurality of sound collecting devices 3A, 3B, and 3C that has received the authentication information (S42). The sound emitting device 2D, based on the identification information, determines whether to emit a sound based on the received collected sound signal (S43). The sound emitting device 2D, in a case of emitting a sound based on the received collected sound signal (S43: YES), performs signal processing on the received collected sound signal (S44). The sound emitting device 2D emits a sound based on an audio signal obtained by performing the signal processing on the collected sound signal (S45).

In addition, the sound emitting device 2D, in a case of emitting no sound based on the received collected sound signal (S43: NO), ends the processing.

Communication between the sound emitting device 2D and the sound collecting devices 3A, 3B, and 3C will be described with reference to FIG. 14. It is to be noted that, while the sound collecting device 3A is described as a representative, the sound collecting devices 3B and 3C also communicate with the sound emitting device 2D in the same procedure as the sound collecting device 3A. On the other hand, the sound collecting device 3D is placed in the different space 11 from the closed space 10 (see FIG. 1), so that, although the sound collecting device 3D is connected to the sound emitting device 2D in the network 4, an audio signal does not reach the sound collecting device 3D from the sound emitting device 2D, and the sound collecting device 3D does not send a collected sound signal to the sound emitting device 2D.

In the microphone authentication system 1C, as shown in FIG. 14, the sound collecting device 3A obtains a surrounding sound (S51). The sound emitting device 2D sends authentication information (S52). The sound collecting device 3A receives the authentication information (S53). The sound collecting device 3A sends identification information to the sound emitting device 2D that has sent the authentication information through the network 4 (S54). The sound emitting device 2D receives the identification information (S55). The sound collecting device 3A performs signal processing on the obtained sound (S56). The sound collecting device 3A sends the collected sound signal obtained by performing the signal processing on the sound, to the sound emitting device 2D, through the network 4 (S57). The sound emitting device 2D receives the collected sound signal (S58). The sound emitting device 2D performs signal processing on the received collected sound signal (S59). The sound emitting device 2D emits a sound based on an audio signal obtained by performing the signal processing on the collected sound signal (S60).

In the microphone authentication system 1C of the third modification, the sound emitting device 2D emits a sound based on only the collected sound signal of the sound the specific sound collecting device 3A among the sound collecting devices 3A, 3B, and 3C placed within the closed space 10 has collected. In short, in the microphone authentication system 1C of the third modification, the sound emitting device 2D, based on the identification information, is able to emit a sound based on only the collected sound signal received from the specific sound collecting device.

It is to be noted that the sound emitting device 2D of the third modification may be configured so as to receive only a specific collected sound signal. In addition, the sound emitting device 2D of the third modification may be configured to receive a collected sound signal from each of all the sound collecting devices 3A, 3B, and 3C placed within the closed space 10, and, based on an identification signal, to emit a sound based on only a specific collected sound signal.

For example, the microphone authentication system 1C is assumed to be used in a conference room. In the conference room (the closed space 10), the sound emitting device 2D emits a sound based on the collected sound signal of only a sound collecting device of a user who participates in a conference. In other words, the sound emitting device 2D emits a sound based on the collected sound signal of only the sound collecting device 3A, for example, among the sound collecting devices 3A, 3B, and 3C placed in the conference room.

In addition, the memory 22 of the sound emitting device 2D may store time information. The sound emitting device 2D, based on the time information, emits a sound based on only a specific collected sound signal.

For example, the microphone authentication system 1C is assumed to be used in a conference room. The memory 22 of the sound emitting device 2D is assumed to store the start time and end time of a conference. The sound emitting device 2D, during a period from the start time to the end time, emits a sound based on a collected sound signal to be sent from each of the plurality of sound collecting devices (portable terminals, for example) 3A, 3B, and 3C within the conference room (the closed space 10). In other words, in the microphone authentication system 1C, before the start time of the conference or after the end time of the conference, the sound emitting device 2D does not emit a sound based on the collected sound signal from the plurality of sound collecting devices 3A, 3B, and 3C within the conference room.

In addition, in the microphone authentication system 1C, the sound emitting device 2D, based on the identification information and the time information, may have a recording function to record a specific collected sound signal.

The microphone authentication system 1C of the third modification causes the memory 22 to store a sound collecting device and time that the sound emitting device 2D requires to emit a sound, and thus the sound emitting device 2D is able to automatically emit a sound based on a collected sound signal received from a specific sound collecting device, at a desired time. In the microphone authentication system 1C of the third modification, it is possible to execute various functions based on time information and identification information, which can reduce a burden on a user.

Furthermore, while the microphone authentication system 1C of the third modification provides an example in which the memory 22 of the sound emitting device 2D stores the identification information of the sound collecting devices 3A, 3B, and 3C (and 3D) and the time information, the present invention is not limited to the example. The time information and the identification information of the sound collecting devices 3A, 3B, and 3C (and 3D), as shown in FIG. 15, may be stored in a memory 51 of the server 5 connected through the network 4, for example. The sound emitting device 2D may be configured to appropriately read identification information from the memory 51 of the server 5.

Finally, the foregoing preferred embodiments are illustrative in all points and should not be construed to limit the present invention. The scope of the present invention is defined not by the foregoing preferred embodiments but by the following claims. Further, the scope of the present invention is intended to include all modifications within the scopes of the claims and within the meanings and scopes of equivalents.

What is claimed is:

1. A sound emitting device comprising:
   a communicator that sends authentication information;
   a collected sound receiver that receives a collected sound signal from a sound collecting device that has received the authentication information sent by the communicator;
   a sound emitter that emits sound based on the collected sound signal;
   an information receiver that receives identification information of the sound collecting device;
   a memory that stores the identification information of the sound collecting device; and
   a controller that, based on the identification information, determines whether to emit sound based on the collected sound signal of the sound collecting device.

2. The sound emitting device according to claim 1, wherein the communicator:
   provides a short-distance communication function; and
   sends the authentication information via the short-distance communication function.

3. The sound emitting device according to claim 1, wherein the communicator:
   provides a communication function that limits a transmittable range to an inside of a partitioned space, and
   sends the authentication information via the communication function.

4. The sound emitting device according to claim 1, wherein the communicator sends the authentication information via either an audio signal or a light signal.

5. The sound emitting device according to claim 1, wherein the communicator sends the authentication information via a signal set to desired intensity.

6. The sound emitting device according to claim 1, wherein the communicator sends the authentication information via a signal with a directivity.

7. The sound emitting device according to claim 1, wherein the sound collecting device comprises:
   a collected sound inputter that obtains the sound emitted by the sound emitter;
   an authentication information receiver that receives the authentication information from the communicator; and
   a collected sound outputter that outputs the collected sound signal obtained by the collected sound inputter, to the collected sound receiver, based on the received authentication information.

8. A sound emitting device comprising:
   a communicator that sends authentication information;
   a collected sound receiver that receives a collected sound signal from a sound collecting device that has received the authentication information sent by the communicator;
   a sound emitter that emits sound based on the collected sound signal;
   a memory that stores time information; and
   a controller that, based on the time information, determines whether to emit sound based on the collected sound signal of the sound collecting device.

9. The sound emitting device according to claim 8, wherein the sound collecting device comprises:
   a collected sound inputter that obtains the sound emitted by the sound emitter;

an authentication information receiver that receives the authentication information from the communicator; and a collected sound outputter that outputs the collected sound signal obtained by the collected sound inputter, to the collected sound receiver, based on the received authentication information.

10. A sound collecting device comprising:

a collected sound inputter that obtains sound;

an authentication information receiver that receives authentication information from a sound emitting device;

a collected sound outputter that outputs a collected sound signal obtained by the collected sound inputter, to the sound emitting device, based on the received authentication information; and a controller that determines, based on received authentication information, whether to perform authentication, depending on intensity of a signal including the authentication information sent from the sound emitting device.

11. The sound collecting device according to claim 10, wherein the authentication information is sent by a communicator providing a communication function that limits a transmittable range to an inside of a partitioned space.

12. The sound collecting device according to claim 10, wherein the authentication information receiver receives either an audio signal or a light signal.

13. A microphone authentication system comprising:

the sound collecting device according to claim 10; and a sound emitting device comprising:

a communicator that sends the authentication information;

a collected sound receiver that receives the collected sound signal from the sound collecting device that has received the authentication information sent by the communicator; and a sound emitter that emits sound based on the collected sound signal, wherein the sound emitting device and the sound collecting device are disposed within a same partitioned space.

14. A microphone authentication system comprising:

the sound collecting device according to claim 10; and a plurality of sound emitting devices, including a first sound emitting device and a second sound emitting device, each of the plurality of sound emitting device comprising:

a communicator that sends the authentication information;

a collected sound receiver that receives the collected sound signal from the sound collecting device that has received the authentication information sent by the communicator; and a sound emitter that emits sound based on the collected sound signal, wherein the first sound emitting device is disposed in a partitioned space and the second sound emitting device, which is connected to the first sound emitting device, is disposed in a space different from the partitioned space, wherein the authentication information includes:

first authentication information of the first sound emitting device; and second authentication information of the second sound emitting device;

wherein the sound collecting device outputs the collected sound signal to the first sound emitting device and the second sound emitting device based on the authentication information, and wherein the second sound emitting device receives the collected sound signal from the sound collecting device and emits sound based on the collected sound signal.

15. A microphone authentication method comprising:

sending authentication information via a sound emitting device;

receiving a collected sound signal output from a sound collecting device that has received the authentication information;

emitting sound based on the collected sound signal via the sound emitting device;

receiving identification information of the sound collecting device via the sound emitting device;

storing the identification information of the sound collecting device in a memory; and determining, based on the identification information, whether to emit sound based on the collected sound signal of the sound collecting device.

16. The microphone authentication method according to claim 15, wherein:

the sound emitting device provides a communication function that limits a transmittable range to an inside of a partitioned space, the sending sends the authentication information via the communication function.

17. The microphone authentication method according to claim 15, wherein:

the sound emitting device provides a short distance communication function, and the sending sends the authentication information via the short-distance communication function.

18. The microphone authentication method according to claim 15, wherein the sending sends the authentication information as either an audio signal or a light signal.

19. The microphone authentication method according to claim 15, wherein the sending sends the authentication information via a signal set to a desired intensity.

20. A microphone authentication method comprising:

sending authentication information via a sound emitting device;

receiving a collected sound signal output from a sound collecting device that has received the authentication information;

emitting sound based on the collected sound signal via the sound emitting device;

storing time information in a memory; and determining, based on the time information, whether to emit sound based on the collected sound signal of the sound collecting device.

* * * * *